United States Patent [19]
Polley et al.

[11] 3,745,415
[45] July 10, 1973

[54] CIRCUIT BREAKER PANELBOARD WITH GROUNDED NEUTRAL PROTECTION

[75] Inventors: Bruce T. Polley, Vallejo; Wallace W. Wahlgren, Oakland, both of Calif.

[73] Assignee: The Rucker Company, Oakland, Calif.

[22] Filed: Oct. 24, 1972

[21] Appl. No.: 299,816

[52] U.S. Cl. .................................. 317/18 D, 317/26
[51] Int. Cl. .............................................. H02h 3/28
[58] Field of Search ............................ 317/18 D, 26

[56] References Cited
UNITED STATES PATENTS
3,539,866  11/1970  Stevenson ........................ 317/18 D
3,611,038  10/1971  Benhan ............................. 317/18 D Primary Examiner—James D. Trammell
Attorney—Paul D. Flehr, Harold C. Hohach et al.

[57] ABSTRACT

Circuit breaker panelboard assembly in which each breaker includes ground fault responsive means, and means is provided externally of the breakers for preventing the ground fault responsive means for being rendered ineffective by grounding of the neutral conductor in one of the branch circuits served by the panelboard assembly.

10 Claims, 4 Drawing Figures

CIRCUIT BREAKER PANELBOARD WITH GROUNDED NEUTRAL PROTECTION

BACKGROUND OF THE INVENTION

This invention pertains generally to electrical safety devices and more particularly to a circuit breaker panelboard assembly having built-in ground fault protection.

Circuit breaker panelboard assemblies are commonly used at the electrical service entrance of buildings for distributing current from main lines feeding the building to branch circuits within the building. A separate circuit breaker is generally provided for each branch circuit, and the breaker usually includes means for disconnecting the circuit from the main lines in the event of an "overcurrent" condition (i.e., a current on the order of 125 to 300 percent of the nominal rating of the breaker) or a "short circuit" condition (i.e., a current in excess of approximately 300 percent of the nominal rating). The neutral conductor of the main lines is normally connected to ground at its source end, and recently some circuit breakers intended for use in panelboard assemblies have been provided with ground fault responsive means for protecting human life and property against electrical shock and damage resulting from contact with or grounding of one of the line conductors in a branch circuit. Such breakers typically include a differential transformer having a magnetic core and primary windings of at least one turn connected in series with the line and neutral conductors. The transformer also includes a secondary winding which is connected to means for giving a visual indication of a ground fault and/or interrupting the flow current in the distribution system in response thereto. Under normal conditions, the total current flowing through the line conductor is equal to the current flowing through the neutral conductor, producing a zero net magnetic flux in the differential transformer core and no output from the secondary winding. Upon the occurrence of a ground fault, the current in the line conductor differs from that in the neutral conductor by an amount corresponding to the magnitude of the fault current. This difference produces a nonzero net magnetic flux in the transformer core and induces a fault signal in the secondary winding.

While devices of the above character operate satisfactorily under most conditions, their operation is seriously impaired by the occurrence of a low impedance grounding of the neutral conductor between the differential transformer and the load. Under normal fault conditions, the current produced by a ground fault returns to the source via ground conductors such as grounding wires, metal conduits or pipes, metal building frames, wet insulation, water, damp earth, faulty installations, damaged appliances or equipment and the like, bypassing the portion of the neutral conductor which passes through the differential transformer. Grounding of the neutral conductor on the load side of the differential transformer provides an alternate path to the source for a ground fault current, causing only a portion of the current to return to the source through the neutral conductor and the differential transformer. This substantially reduces the sensitivity of the transformer and makes it impossible to insure the level of fault current required to produce tripping, the increase in fault current required being dependent upon the magnitude of the impedance between the neutral conductor and ground. In addition, grounding of the neutral conductor on both sides of the transformer causes the neutral to act effectively as a shorted secondary winding which reduces the effectiveness of the transformer and makes it difficult to insure the level of fault current which will produce tripping.

Heretofore, in order to prevent the ground fault responsive means in circuit breakers from being rendered inoperative by grounding of the neutral conductor in the branch circuit, the breakers have each been provided with means for detecting grounding of the neutral conductor. Such means has been incorporated in and forms an integral part of each breaker in the panelboard.

SUMMARY AND OBJECTS OF THE INVENTION

In the panelboard assembly of the present invention, each circuit breaker includes ground fault protection, and grounded neutral protection is provided externally of the breakers. A transformer mounted in the panelboard has a normally energized primary winding and a plurality of secondary windings connected electrically in series with conductors leading to the neutral conductors in the branch circuits. In the event that one of these conductors becomes grounded, the transformer induces an additional current in it, and this current causes the breaker for the particular circuit to trip.

It is in general an object of the invention to provide a new and improved circuit breaker panelboard assembly having ground fault protection and means for preventing the ground fault protection from being rendered inoperative by grounding of the neutral conductor.

Another object of the invention is to provide a panelboard assembly of the above character in which the grounded neutral protection is provided externally of the circuit breakers.

Another object of the invention is to provide a more reliable signal that an extraneous ground exists in a circuit.

Another object of the invention is to eliminate some of the components and circuitry from the ground fault protected breakers, making them less expensive to build.

Another object of the invention is to reduce the overall cost of circuit breaker panelboards incorporating ground fault protection.

Additional objects and features of the invention will be apparent from the following description in which the preferred embodiments are set forth in detail in conjunction with the accompanying drawing.

DESCRIPTION OF THE PREFERRED EMBODIMENTS

Figure 1:
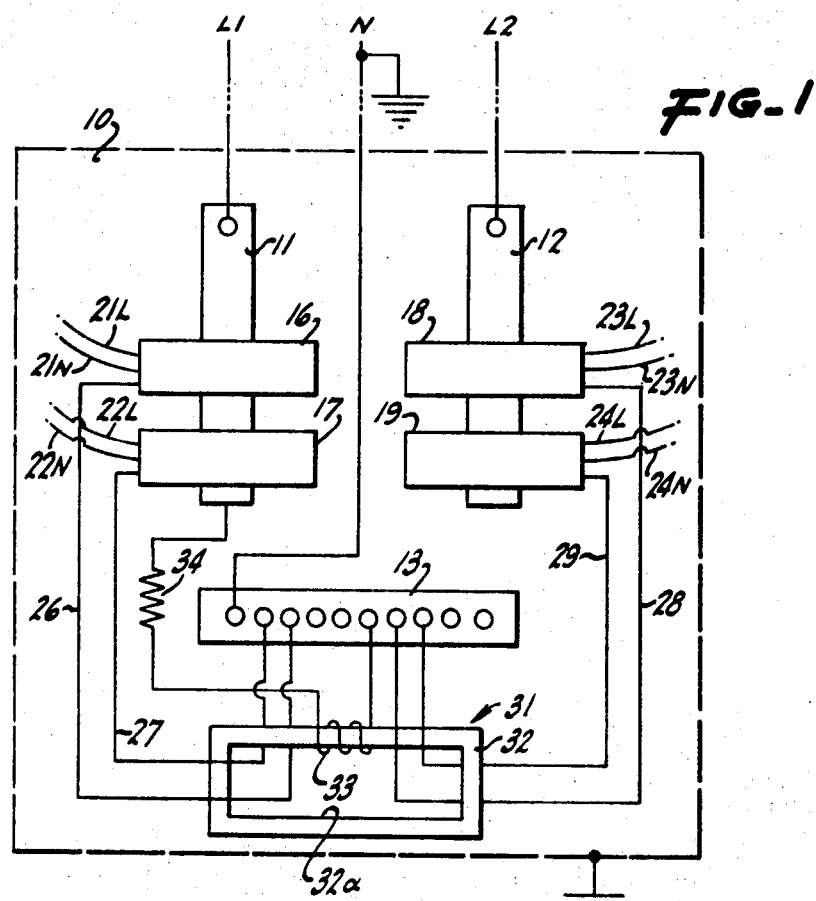
FIG. 1 is a schematic illustration of one embodiment of a panelboard assembly with ground fault and grounded neutral protection incorporating the present invention.

In the drawings, the invention is illustrated in connection with a single-phase, three-wire main line system consisting of line conductors L1 and L2 and a neutral conductor N which is connected to ground at its source end. The panelboard assembly is enclosed in an enclosure 10 which in the preferred embodiment is fabricated of sheet metal and grounded. Line buses 11 and 12 and a neutral bus 13 are provided within the enclosure and adapted respectively for connection to line conductors L1 and L2 and neutral conductor N.

A plurality of circuit breakers 16–19 are mounted in the enclosure and control the flow of current from the line and neutral buses to a plurality of branch circuits 21–24. Each of these circuits includes line and and neutral conductors designated respectively by the letters L and N. Breakers 16 and 17 have input terminals which releasably engage line bus 11 and pigtails 26 and 27 which are connected to neutral bus 13. Breakers 18 and 19 likewise have input terminals which engage line bus 12 and pigtails 28 and 29 which connect to neutral bus 13. Thus, breakers 16 and 17 control the flow of current between main line conductors L1 and N and branch circuit conductors 21L, 21N, 22L and 22N, while breakers 18 and 19 control theflow between main line conductors L2 and N and branch circuit conductors 23L, 23N, 24L, and 24N. For convenience of illustration, only four breakers are shown in the drawing. However, it will be understood that additional breakers can be connected in parallel with those shown for controlling the flow of current to additional branch circuits.

Each of the circuit breakers in the assembly has built-in ground fault protection in addition to short circuit and over current protection. Breakers of this type are described in detail in copending application Ser. NO. 141,298, filed May 7, 1971 and assigned to the assignee herein. Briefly, these breakers include a differential transformer for monitoring the flow of current in the line and neutral conductors, a set of contacts for controlling the flow of current in the conductors, and means for opening the contacts in response to a short circuit, an overcurrent or an imbalance in the currents monitored by the differential transformer.

Means is provided for preventing the ground fault responsive means in the circuit breakers from being defeated by grounding of the neutral conductors in the branch circuit. This means includes a transformer 31 having a core 32 of magnetic material defining a window 32a. A primary winding 33 is wound on the core and energized from the main lines. One end of the winding is connected directly to neutral bus 13, and the other end is connected to line bus 11 through a resistor 34. This resistor serves as a current limiting resistor, and it is preferably chosen to have a value corresponding to the resistance of the primary winding so that approximately one half of the line voltage is applied to the winding. Pigtails 26–29 pass through core window 32a to form single turn secondary windings. Since the currents in line conductors L1 and L2 are out of phase with each other, the neutral pigtails associated with these conductors pass through the core window in opposite directions so that the ampere-turns produced by the pigtails will be additive rather than of subtractive polarity. Thus, pigtails 26 and 27 pass through the core in one direction, and pigtails 28 and 29 pass through the core in the opposite direction. In the preferred embodiment, the number of turns in primary winding 33, the size of resistor 34, and the cross-sectional area of core 32 are chosen to be such that the core operates near saturation when excited by primary winding 33 and induces a secondary voltage on the neutral of approximately 50 millivolts. The direction of pigtails 26–29 is such that any current flowing therein causes the core to saturate and hence increases the secondary theory induced voltage a small percentage. Resistor 34 limits the primary current to a safe value, and the surface area of the core is made sufficiently large to dissipate the heat of saturation.

Figure 2:
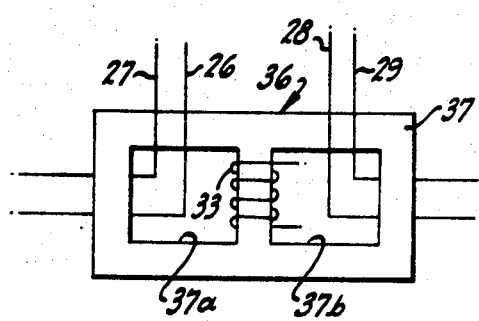
FIGS. 2-4 are schematic illustrations of other forms of transformer constructions which can be utilized in the panelboard assembly of FIG. 1.

FIG. 2 illustrates another form of transformer construction 36 which can be used in the panelboard assembly of FIG. 1. This transformer has a core 37 which is formed to include a pair of windows 37a and 37b. Pigtails 26 and 27 pass through windows 37a, and the pigtails 28 and 29 pass through windows 37b, with all of the pigtails passing through the core in the same direction. Primary winding 33 is wound on the central leg of core 37. This construction provides the same phase relationships as the single window structure shown in FIG. 1.

Figure 3:
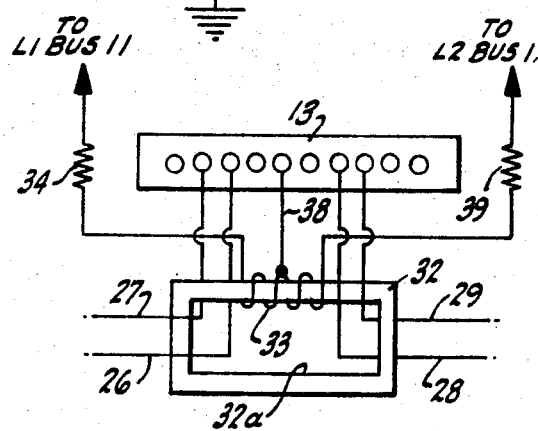
Figure 4:
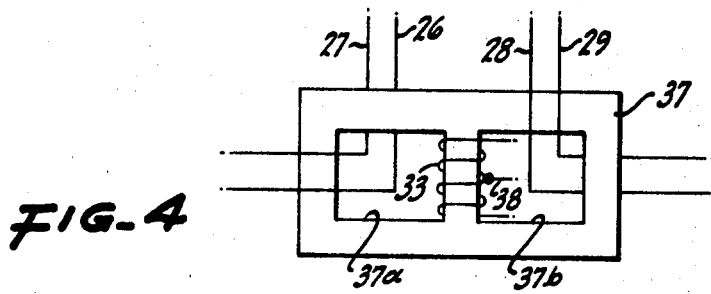

FIGS. 3 and 4 illustrate two additional transformer constructions which can be utilized in the panelboard assembly of FIG. 1. These transformers are generally similar to those shown in FIGS. 1 and 2, respectively, except that primary winding 33 is formed in two parts connected electrically in series, as for example, by a center tab 38. The center tab is connected to neutral bus 13, and one end of the winding is connected to line bus 11 through resistor 34. The other end of the winding is connected to line bus 12 through a resistor 39. Pigtails 26–29 pass through the core windows as before.

If desired, in any of the transformer constructions illustrated, primary winding 33 can be energized from a source other than the main line conductors. For example, this winding can be energized by a high frequency pulser of the type shown and described in U.S. Pat. No. 3,611,035 issued Oct. 5, 1971 to the assignee herein.

Operation and use of the panelboard assembly can be described briefly. In the absence of a ground fault, short circuit or overcurrent, the contacts of circuit breakers 16–19 are closed, and current passes from the main lines to the conductors of the branch circuits. In the event of a ground fault in one of the branch circuits, as would occur, for example, if a person accidentally contacted conductor 21L, the circuit breaker for that circuit would detect an imbalance in the current in the line and neutral conductors and disconnect the circuit from the main lines.

During normal conditions, primary winding 33 is energized, but no additional current is produced in any of the neutral conductors as long as these conductors remain ungrounded on the load side. In the event that one of the branch circuit neutral conductors becomes grounded, an induced current will flow in that conductor because of the secondary voltage of the transformer, producing an imbalance which causes the breaker for the circuit to trip. The other breakers remain closed, and their circuits continue to receive power.

The invention has a number of important features and advantages. It prevents the normal operation of a circuit breaker with ground fault protection from being defeated by inadvertent grounding of the neutral conductor. It provides individual protection for each branch circuit, yet avoids unnecessary duplication of parts. Moreover, it can readily be incorporated in existing panelboards.

It is apparent from the foregoing that a new and improved panelboard assembly has been provided. While only the presently preferred embodiments have been described, as will be apparent to those familiar with the art, certain changes and modifications can be made without departing from the scope of the invention as defined by the following claims.

We claim:

1. In a circuit breaker panel assembly for distributing current from main lines to a plurality of branch circuits, said main lines and each of said branch circuits including at least one line conductor and a neutral conductor, the neutral conductor of said main lines being connected to ground at its source end, an enclosure, line and neutral terminals in the enclosure for connection to the line and neutral conductors of the main line, a plurality of circuit breakers connected to the line and neutral terminals and adapted for connection to the line and neutral conductors of the branch circuit for controlling the flow of current from the main lines to the branch circuits, each of said circuit breakers including ground fault responsive means for monitoring the flow of current through the same and interrupting said flow in the event of an imbalance in the current, and means mounted externally of the circuit breakers for inducing an additional current in the neutral conductors in the event that one of the neutral conductors in a branch circuit is grounded.

2. An assembly as in claim 1 wherein the circuit breakers are connected to the neutral terminals by means of conductors passing through a core of magnetic material, said core having a winding thereon connected to a source of electric energy.

3. An assembly as in claim 2 wherein the winding is connected to the line and neutral terminals.

4. An assembly as in claim 3 together with a current limiting resistor connected electrically in series with the winding.

5. A circuit breaker panel assembly for distributing current from main lines to a plurality of branch circuits, Said main lines and each of said branch circuits including at least one line conductor and a neutral conductor, the neutral conductor of said main lines being connected to ground at its source end, an enclosure, line and neutral terminals in the enclosure for connection to the line and neutral conductors of the main lines, a plurality of circuit breakers connected to the line and neutral terminals and adapted for connection to the line and neutral conductors of the branch circuit for controlling the flow of current from the main lines to the branch circuits, each of said circuit breakers including ground fault responsive means for monitoring the flow of current through the same and interrupting said flow in the event of an imbalance in the current, and a transformer having a primary winding connected to a source of electrical energy and a plurality of secondary windings connected electrically in series with the neutral conductors.

6. An assembly as in claim 5 wherein the transformer includes a core of magnetic material and the circuit breakers are connected to the neutral terminal by means of conductors passing through said core.

7. An assembly as in claim 6 wherein first and second line terminals are provided for connection to first and second line conductors in the main lines, a first group of the circuit breakers is connected to the first line terminal, a second group of the circuit breakers is connected to the second line terminal, and the conductors connecting the first and second groups of the circuit breakers to the neutral terminal pass through the transformer core in opposite directions.

8. An assembly as in claim 6 wherein first and second line terminals are provided for connection to first and second line conductors in the main lines, a first group of the circuit breakers is connected to the first line terminal, a second group of the circuit breakers is connected to the second line terminal, the transformer core has two separate windows and the conductors connecting the first and second groups of circuit breakers to the neutral terminal pass through different ones of said windows.

9. An assembly as in claim 5 wherein the primary winding is connected to the line and neutral terminals.

10. An assembly as in claim 9 together with a current limiting resistor connected electrically in series with the primary winding.

* * * * *